United States Patent
Xu et al.

(10) Patent No.: US 12,235,044 B1
(45) Date of Patent: Feb. 25, 2025

(54) HEAT-COLLECTING FORAGE DRYING SYSTEM WITH WIND-SOLAR COMPLEMENTARY ENERGY SUPPLY

(71) Applicant: Guangdong Ocean University, Zhanjiang (CN)

(72) Inventors: Qing Xu, Zhanjiang (CN); Yujian Wu, Zhanjiang (CN); Haowei Li, Zhanjiang (CN); Shengxian Xian, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 18/824,892

(22) Filed: Sep. 4, 2024

Related U.S. Application Data

(63) Continuation of application No. PCT/CN2024/105124, filed on Jul. 12, 2024.

(51) Int. Cl.
*F26B 9/06* (2006.01)
*F24S 10/20* (2018.01)
(Continued)

(52) U.S. Cl.
CPC .............. *F26B 9/06* (2013.01); *F24S 10/20* (2018.05); *F24S 20/40* (2018.05); *F26B 21/004* (2013.01);
(Continued)

(58) Field of Classification Search
CPC .......... F26B 9/06; F26B 21/004; F26B 21/08; F26B 21/10; F26B 23/10; H02S 10/12;
(Continued)

(56) References Cited

U.S. PATENT DOCUMENTS

| 434,313 A | * | 8/1890 | Arnold | ...... F26B 9/06 34/233 |
| 3,236,294 A | * | 2/1966 | Thomason | ...... F24S 10/50 126/609 |

(Continued)

FOREIGN PATENT DOCUMENTS

| CN | 1865782 A | 11/2006 |
| CN | 202973773 U | 6/2013 |

(Continued)

*Primary Examiner* — Edelmira Bosques
*Assistant Examiner* — Bao D Nguyen
(74) *Attorney, Agent, or Firm* — Bayramoglu Law Offices LLC

(57) ABSTRACT

A heat-collecting forage drying system with wind-solar complementary energy supply includes a drying storehouse, an energy supply device and a drying system. The energy supply device includes a solar photovoltaic power generation plate, a wind turbine and a storage battery. The drying system includes an air-heat drying device and a hydrothermal drying device. The air-heat drying device includes a first solar collector, an air collector tube, an air blower and a standby electric auxiliary heater. The drying storehouse is provided with a flow equalizing plate. The flow equalizing plate separates the drying storehouse into an air inlet chamber and a storage chamber. The hydrothermal drying device includes a second solar collector, a water flow collector tube, a circulating water pump and a heat exchanger. The heat exchanger is mounted on the forage placing station, and the heat exchanger is in communication with the circulating water pump.

6 Claims, 2 Drawing Sheets

(51) Int. Cl.
   *F24S 20/40*    (2018.01)
   *F26B 21/00*    (2006.01)
   *F26B 21/08*    (2006.01)
   *F26B 21/10*    (2006.01)
   *F26B 23/10*    (2006.01)
   *H02S 10/12*    (2014.01)
   *H02S 40/44*    (2014.01)
   *H02S 20/32*    (2014.01)

(52) U.S. Cl.
   CPC .............. *F26B 21/08* (2013.01); *F26B 21/10* (2013.01); *F26B 23/10* (2013.01); *H02S 10/12* (2014.12); *H02S 40/44* (2014.12); *H02S 20/32* (2014.12)

(58) Field of Classification Search
   CPC .......... H02S 40/44; H02S 20/32; F24S 10/20; F24S 20/40
   See application file for complete search history.

(56) References Cited

U.S. PATENT DOCUMENTS

| | | | | |
|---|---|---|---|---|
| 3,254,703 A | * | 6/1966 | Thomason | F24S 10/80 126/633 |
| 3,600,823 A | * | 8/1971 | Borron | F26B 9/063 34/122 |
| 3,902,474 A | * | 9/1975 | Pyle | F24S 20/67 126/630 |
| 3,908,631 A | * | 9/1975 | Rom | F24S 10/20 126/714 |
| 3,919,784 A | * | 11/1975 | Tonn | F24S 10/501 34/93 |
| 4,000,851 A | * | 1/1977 | Heilemann | F24S 10/742 126/633 |
| 4,080,221 A | * | 3/1978 | Manelas | F24S 10/72 136/246 |
| 4,122,828 A | * | 10/1978 | DiPeri | F28F 9/0265 126/400 |
| 4,125,946 A | * | 11/1978 | Prager | F24S 10/80 126/400 |
| 4,187,123 A | * | 2/1980 | Diggs | H01L 31/0543 136/246 |
| 4,205,657 A | * | 6/1980 | Kelly | F24S 10/20 136/246 |
| 4,215,673 A | * | 8/1980 | Cohen | F24S 10/753 126/632 |
| 4,272,268 A | * | 6/1981 | Greiner | F25B 17/08 62/480 |
| 4,279,082 A | * | 7/1981 | Commander | D06F 58/22 34/607 |
| 4,280,328 A | * | 7/1981 | Falconer | F24S 10/748 290/1 R |
| 4,302,942 A | * | 12/1981 | Charters | F25B 13/00 62/235.1 |
| 4,432,147 A | * | 2/1984 | Chen | F26B 3/286 34/93 |
| 4,441,484 A | * | 4/1984 | Greiner | F24S 40/10 126/630 |
| 4,514,914 A | * | 5/1985 | Kitzmiller | D06F 58/26 126/643 |
| 5,522,944 A | * | 6/1996 | Elazari | F24S 20/67 320/101 |
| 5,573,600 A | * | 11/1996 | Hoang | F24S 60/30 126/622 |
| 5,992,048 A | * | 11/1999 | DeVore | F26B 3/286 34/93 |
| 8,561,315 B2 | * | 10/2013 | Thompson | F26B 9/063 34/169 |
| 8,627,581 B2 | * | 1/2014 | Brown | D06F 58/20 34/607 |
| 10,208,735 B1 | * | 2/2019 | Anthony | F03D 9/18 |
| 10,400,385 B2 | * | 9/2019 | Brown | D06F 58/26 |
| 2005/0044853 A1 | * | 3/2005 | Yoshino | H01M 16/006 60/641.8 |
| 2006/0218812 A1 | * | 10/2006 | Brown | D06F 58/263 34/86 |
| 2010/0326424 A1 | * | 12/2010 | Bennett | B64D 27/24 126/600 |
| 2011/0049992 A1 | * | 3/2011 | Sant'Anselmo | H02S 10/12 307/64 |
| 2011/0099834 A1 | * | 5/2011 | Brown | D06F 58/20 34/132 |
| 2011/0146751 A1 | * | 6/2011 | McGuire | F03D 9/007 136/245 |
| 2011/0204720 A1 | * | 8/2011 | Ruiz | B60L 53/305 307/66 |
| 2011/0213506 A1 | * | 9/2011 | Gamboa Tuesta | F03D 9/007 700/287 |
| 2011/0296708 A1 | * | 12/2011 | Thompson | F26B 23/10 34/565 |
| 2012/0227730 A1 | * | 9/2012 | Teoh | F24S 60/30 62/310 |
| 2013/0118478 A1 | * | 5/2013 | Armstrong | F24S 10/40 126/646 |
| 2013/0212901 A1 | * | 8/2013 | Shan | A24B 3/18 34/549 |
| 2013/0213455 A1 | * | 8/2013 | Matalon | F24S 40/52 126/634 |
| 2014/0167417 A1 | * | 6/2014 | Tang | F24S 60/30 52/173.3 |
| 2014/0175799 A1 | * | 6/2014 | Tabe | F03D 9/25 290/55 |
| 2014/0176337 A1 | * | 6/2014 | Valin | H02J 3/381 340/870.02 |
| 2014/0260002 A1 | * | 9/2014 | Teoh | F24D 11/003 52/173.3 |
| 2018/0266712 A1 | * | 9/2018 | Plourde | F24S 90/00 |
| 2019/0326846 A1 | * | 10/2019 | Ansari | C02F 1/006 |
| 2019/0386610 A1 | * | 12/2019 | Regrut | C12F 3/02 |
| 2021/0376787 A1 | * | 12/2021 | Ryan | H02S 40/32 |
| 2022/0113088 A1 | * | 4/2022 | Millar | F26B 21/06 |
| 2022/0214105 A1 | * | 7/2022 | Bollinger | F26B 9/06 |
| 2023/0105424 A1 | * | 4/2023 | Novak | E04H 1/12 307/26 |
| 2023/0383728 A1 | * | 11/2023 | Wajda | H02S 10/12 |

FOREIGN PATENT DOCUMENTS

| | | | | |
|---|---|---|---|---|
| CN | 103727772 A | * | 4/2014 | |
| CN | 105953528 A | * | 9/2016 | .............. F24S 23/30 |
| CN | 108645143 A | | 10/2018 | |
| CN | 209131254 U | | 7/2019 | |
| CN | 112556342 A | | 3/2021 | |
| CN | 115854671 A | | 3/2023 | |

* cited by examiner

HEAT-COLLECTING FORAGE DRYING SYSTEM WITH WIND-SOLAR COMPLEMENTARY ENERGY SUPPLY

CROSS REFERENCE TO THE RELATED APPLICATIONS

This application is the continuation application of International Application No. PCT/CN2024/105124, filed on Jul. 12, 2024, which is based upon and claims priority to Chinese Patent Application No. 202311807156.6, filed on Dec. 26, 2023, the entire contents of which are incorporated herein by reference.

TECHNICAL FIELD

The present application relates to the technical field of drying system, in particular a heat-collecting forage drying system with wind-solar complementary energy supply.

BACKGROUND

In modern animal husbandry, forage hay is the main forage processing product, which accounts for 70% of grass products, forage drying processing is one of the most important links affecting the quality of grass.

The main production method of forage drying and processing is the dry harvesting process in China, the moisture content of forage is reduced to below the safe moisture content by natural drying, and then the finished forage is bundled; on the other hand, the forage can be harvested, chopped and loaded through the direct harvesting process, and then transported from the field to the drying plant for direct mechanical drying operations to complete the efficient drying and processing production of forage.

Different forage drying methods and device are the key factors affecting the production efficiency and quality of forage, currently, the main forage drying methods include natural drying, hot air drying, and solar drying. The natural drying method does not require special device and has a low cost, but it is susceptible to environmental influences that affect the drying time, and the quality loss is large. Hot air drying is a commonly used mechanical drying method, the air heated by fuel is used to exchange heat and mass with forage to remove moisture, and the drying efficiency is obviously improved, however, the use of coal as the energy source for forage drying will cause environmental pollution, and the cost of fuel is too high. In order to solve this problem, the existing art has also proposed solar drying methods, but most of them are single-energy supply modes of solar energy, the single use of solar energy has certain space-time geographical restrictions due to the instability and discontinuity of solar energy, and the limited drying space restricts the heat and mass exchange efficiency of forage drying.

SUMMARY

In view of this, an objective of the present application is to provide a heat-collecting forage drying system with wind-solar complementary energy supply to solve the technical problems of the instability and discontinuity of the drying process of the existing single solar energy supply mode, which leads to low drying efficiency.

In order to achieve the above-mentioned technical objective, the present application provides a heat-collecting forage drying system with wind-solar complementary energy supply, including a drying storehouse, an energy supply device and a drying device;

the energy supply device includes a solar photovoltaic power generation plate, a wind turbine and a storage battery;

the solar photovoltaic power generation plate and the wind turbine are both electrically connected to the storage battery;

the drying device includes an air-heat drying device and a hydrothermal drying device;

the air-heat drying device includes a first solar collector, an air collector tube, an air blower and a standby electric auxiliary heater;

the drying storehouse is provided with a flow equalizing plate;

the flow equalizing plate separates the drying storehouse into an air inlet chamber and a storage chamber;

the storage chamber is provided with a forage placing station;

the standby electric auxiliary heater is mounted in the air inlet chamber for heating air passing through the air inlet chamber;

the air collector tube is mounted on the first solar collector, and one end of the air collector is in communication with an air inlet end of the air blower via a hot air pipe;

an air outlet end of the air blower is in communication with the air inlet chamber;

the hydrothermal drying device includes a second solar collector, a water flow collector tube, a circulating water pump and a heat exchanger;

the water flow collector tube is mounted on the second solar collector, and one end of the water flow collector tube is in communication with a water inlet end of the circulating water pump via a hot water pipe;

the heat exchanger is mounted on the forage placing station, and one end of the heat exchanger is in communication with a water outlet end of the circulating water pump, and the other end of the heat exchanger is in communication with the other end of the water flow collector tube.

Further, also including a tracking bracket that can track sunlight;

the solar photovoltaic power generation plate, the first solar collector and the second solar collector are mounted on the tracking bracket.

Further, the hydrothermal drying device also includes a first condenser;

the other end of the heat exchanger is in communication with the other end of the water flow collector tube via the first condenser;

the first condenser is used for cooling water flowing back to the water flow collector tube.

Further, the forage placing stations are multiple, and are divided into two sets in a direction close to or away from the flow equalizing plate;

forming a transport aisle between one set of the forage placing stations close to the flow equalizing plate and another set of the forage placing stations away from the flow equalizing plate;

the number of heat exchangers is multiple and corresponds to the forage placing station on a one-to-one basis.

Further, a first grass placing frame is mounted on the set of forage placing stations close to the flow equalizing plate on a one-to-one correspondence;

a second grass placing frame is mounted on another set of forage placing stations away from the flow equalizing plate on the one-to-one correspondence;

the first grass placing frame and the second grass placing frame are both provided with at least one layer of an object placing plate for placing forage and arranged with vent holes;

the heat exchanger is mounted at the bottom of the object placing plate.

Further, the air-heat drying device also includes a filter; the filter is mounted at the other end of the air collector tube.

Further, also including a turbulent fan;

the turbulent fan is mounted on the top of the drying storehouse to form a turbulent flow in the storage chamber.

Further, also including a post-processing device;

the post-processing device includes an exhaust fan, a second condenser, a dust collector and a dust collecting bag;

through the dust collector, an air inlet end of the exhaust fan is in communication with an air outlet of the storage chamber which is in communication with the drying storehouse;

the dust collecting bag is mounted on the dust collector;

the second condenser is used for cooling air during delivery to the dust collector through the air outlet.

Further, the first condenser and the second condenser are both air-cooled condensers;

the air output through the dust collecting bag is returned to a cooling medium inlet of the first condenser and the second condenser via a circulating pipe.

Further, also including a controller, a temperature sensor and a humidity sensor;

a water flow valve is mounted on the hot water pipe;

a wind control valve is mounted on the hot air pipe;

the temperature sensor and the humidity sensor are mounted in the storage chamber;

the controller is electrically connected to the storage battery, the water flow valve, the wind control valve, the temperature sensor, and the humidity sensor.

From the above technical scheme, it can be seen that the heat-collecting forage drying system with wind-solar complementary energy supply designed in the present application has the following beneficial effects:

1, the combination of green renewable solar energy and wind energy resources, solar photothermal, solar photovoltaic, wind power generation, wind energy-mechanical energy multi-energy complementary comprehensive utilization, combined with a variety of utilization methods to ensure the efficient, continuous and stable operation of forage drying, reduced carbon emissions under the conventional fuel heating and drying mode, especially for the northwest and south coastal tropical forage production areas in China.

2, the combination of air-circulating water heat-collecting drying mode is adopted to make the energy conversion and utilization in the drying system more sufficient, and improve the drying efficiency and dry forage quality.

BRIEF DESCRIPTION OF THE DRAWINGS

To explain the embodiments of the present application or the technical solutions in the prior art more clearly, a brief introduction will be made to the accompanying drawings used in the embodiments or the description of the prior art. It is obvious that the drawings in the description below are only some embodiments of the present application, and those ordinarily skilled in the art can obtain other drawings according to these drawings without creative work.

Figure 1:
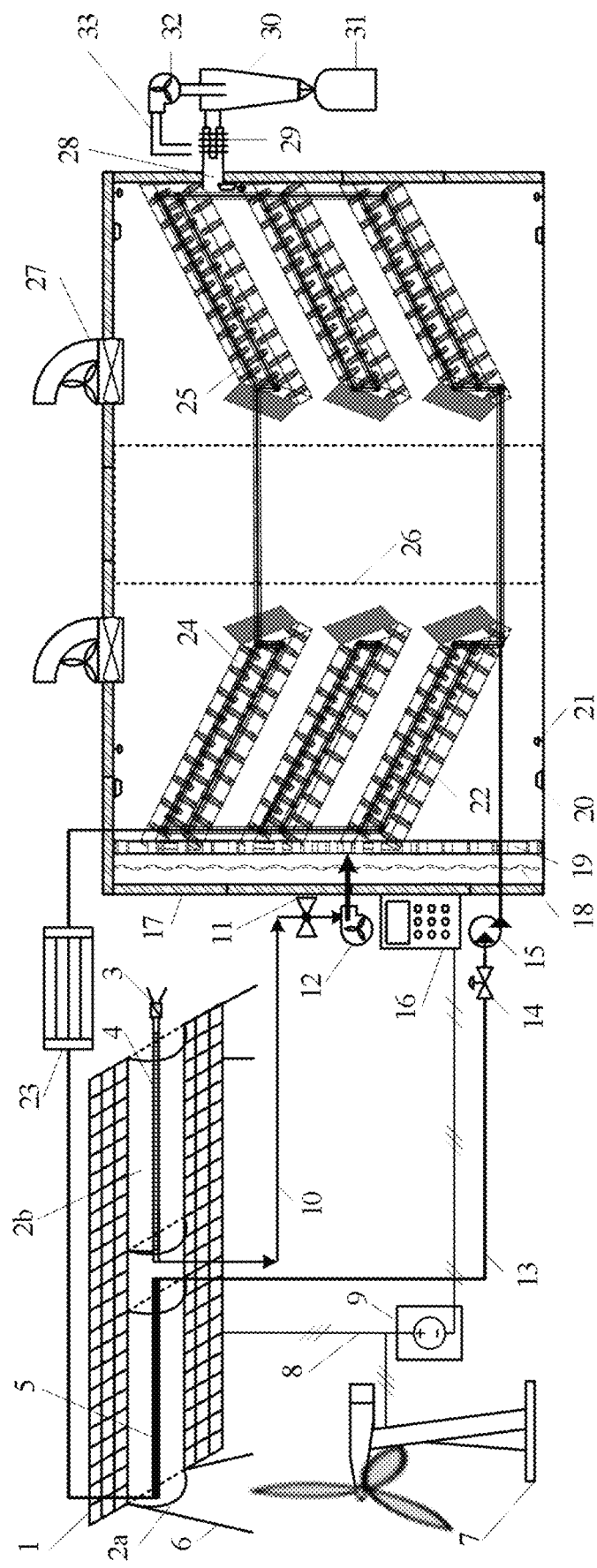
FIG. 1 is a structure diagram of a heat-collecting forage drying system with wind-solar complementary energy supply provided in the present application.

in the figures: 100, an energy supply device; 200, a drying device; 201, an air-heat drying device; 202, a hydrothermal drying device; 300, a post-processing device; 1, a solar photovoltaic power generation plate; 2a, a first solar collector; 2b, a second solar collector; 3, a filter; 4, an air collector tube; 5, a water flow collector tube; 6, a tracking bracket; 7, a wind turbine; 8, a conveying circuit; 9, a storage battery; 10, a hot air pipe; 11, a wind control valve; 12, an air blower; 13, a hot water pipe; 14, a water flow valve; 15, a circulating water pump; 16, a controller; 17, a drying storehouse; 18, a standby electric auxiliary heater; 19, a flow equalizing plate; 20, a temperature sensor; 21, a humidity sensor; 22, a heat exchanger; 23, a first condenser; 24, a first grass placing frame; 25, a second grass placing frame; 26, a transport aisle; 27, a turbulent fan; 28, an air outlet; 29, a second condenser; 30, a dust collector; 31, a dust collecting bag; 32, an exhaust fan; 33, an outlet of cold air.

DETAILED DESCRIPTION OF THE EMBODIMENTS

The following clearly and completely describes the technical solutions in embodiments of the present application with reference to the drawings of the present application. Apparently, the described embodiments are only some but not all of the embodiments of the present application. All other embodiments obtained by those of ordinary skill in the art based on the embodiments in the embodiments of the present application without involving any creative effort shall fall within the scope of protection of the present application.

In the description of the embodiment of the present application, it should be noted that the orientation or positional relationship indicated by the terms 'center', 'up', 'down', 'left', 'right', 'vertical', 'horizontal', 'inside', 'outside' is based on the orientation or positional relationship shown in the drawings. It is only for the convenience of describing the embodiment of this application and simplifying the description, rather than indicating or suggesting that the device or component referred to must have a specific orientation, be constructed and operated in a specific orientation, so it cannot be understood as a restriction on the embodiment of this application. In addition, the terms 'first', 'second' and 'third' are only used for descriptive purposes and cannot be understood as indicating or implying relative importance.

In the description of the embodiment of the present application, it should be noted that unless otherwise clearly defined and limited, the terms "mounted", "connected" and "connection" should be understood in a broad sense. For example, it can be a fixed connection, as a detachable connection or as an integral connection; may be a mechanical connection or an electrical connection; it can be directly connected or indirectly connected through an intermediate medium, and can be the internal connection of two components. For those of ordinary skill in the art, the specific meaning of the above terms in the embodiments of the present application may be understood in specific cases.

The embodiment of present application discloses a heat-collecting forage drying system with wind-solar complementary energy supply.

Figure 2:
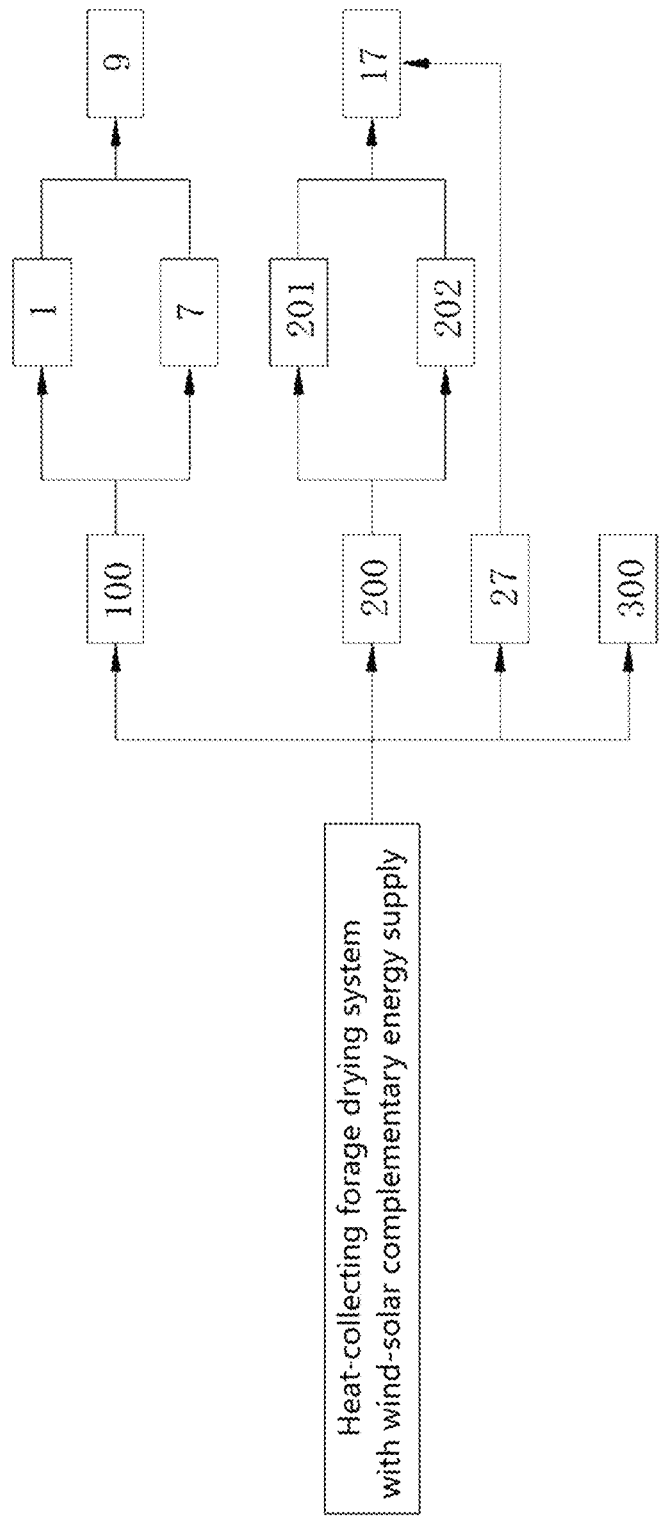
FIG. 2 is a flow chart of a heat-collecting forage drying system with wind-solar complementary energy supply provided in the present application.

Refer to FIG. 1 and FIG. 2, one of the embodiments of a heat-collecting forage drying system with wind-solar complementary energy supply provided in the present application embodiment includes:

a drying storehouse 17, an energy supply device 100 and a drying device 200.

The energy supply device 100 includes a solar photovoltaic power generation plate 1, a wind turbine 7 and a storage battery 9.

The solar photovoltaic power generation plate 1 and the wind turbine 7 are both electrically connected to the storage battery 9, the electric energy generated by photovoltaic power generation and wind power generation is stored in storage battery 9, and then supplied to the required electronic control components or devices, such as a controller 16, an air blower 12, a circulating water pump 15, an exhaust fan 32, a temperature sensor 20, a humidity sensor 21, a standby electric auxiliary heater 18, etc. The solar photovoltaic power generation plate 1 is connected to the storage battery 9 via a conveying circuit 8, and a part of the electric energy is stored for power supply at night or in rainy weather; similarly, the wind turbine 7 is connected to the storage battery 9 via the conveying circuit 8, and a part of the electric energy converted by wind energy is stored for power supply at night or in rainy weather. The functional device is mainly based on renewable energy functions, with storage battery energy storage and external circuits as standby electric auxiliary heat energy.

The drying device 200 includes an air-heat drying device 201 and a hydrothermal drying device 202.

The air-heat drying device 201 includes a first solar collector 2a, an air collector tube 4, the air blower 12 and a standby electric auxiliary heater 18.

The drying storehouse 17 is provided with a flow equalizing plate 19, the flow equalizing plate 19 separates the drying storehouse 17 into an air inlet chamber and a storage chamber, the flow equalizing plate 19 is an existing flow equalizing structure design, which has a flow equalizing effect, it can be a design with louvers to adjust the direction of the air outlet, or a design directly for a uniformly distributed flow equalizing hole, without restrictions.

The storage chamber is provided with a forage placing station to facilitate the storage of forage.

The standby electric auxiliary heater 18 is mounted in the air inlet chamber for heating air passing through the air inlet chamber. The standby electric auxiliary heater 18 can be an electric auxiliary heating band, the electric heating is carried out by relying on wind power generation to obtain hot air when the solar thermal and photoelectric supply is insufficient, so as to realize multi-energy complementary and ensure the continuous and stable drying operation of forage.

The air collector tube 4 is mounted on the first solar collector 2a, and one end of the air collector is in communication with an air inlet end of the air blower 12 via a hot air pipe 10, an air outlet end of the air blower 12 is in communication with the air inlet chamber. The air enters the air collector tube 4, forms hot air under the heating effect of the first solar collector 2a, and then enters the air inlet chamber through the hot air pipe 10 and the air blower 12, and then is uniformly transported to the storage chamber through the flow equalizing plate 19 to purge and dry the forage in the storage chamber.

The hydrothermal drying device 202 includes a second solar collector 2b, a water flow collector tube 5, a circulating water pump 15 and a heat exchanger 22.

The water flow collector tube 5 is mounted on the second solar collector 2b, and one end of the water flow collector tube is in communication with a water inlet end of the circulating water pump 15 via a hot water pipe 13; the heat exchanger 22 is mounted on the forage placing station, and one end of the heat exchanger is in communication with a water outlet end of the circulating water pump 15, and the other end of the heat exchanger is in communication with the other end of the water flow collector tube 5. The second solar collector 2b heats the circulating water in the water flow collector tube 5, the heated circulating water passes through the hot water pipe 13 and the circulating water pump 15 into the heat exchanger 22 in the storage chamber, and then circulates from the heat exchanger 22 return to the water flow collector tube 5 to form a complete circulating water collector drying circuit. The heat exchanger 22 can be a tube-fin structure without restrictions. The heat exchanger 22 is preferably arranged below the forage to dry the forage together with the hot air output from the flow equalizing plate 19.

The heat-collecting forage drying system with wind-solar complementary energy supply designed in the present application has the following beneficial effects:

1, the combination of green renewable solar energy and wind energy resources, solar photothermal, solar photovoltaic, wind power generation, wind energy-mechanical energy multi-energy complementary comprehensive utilization, combined with a variety of utilization methods to ensure the efficient, continuous and stable operation of forage drying, reduced carbon emissions under the conventional fuel heating and drying mode, especially for the northwest and south coastal tropical forage production areas in China.

2, compared with the single drying mode design, the combination of air-circulating water heat-collecting drying mode is adopted to make the energy conversion and utilization in the drying system more sufficient, and improve the drying efficiency and dry forage quality.

The above embodiment 1 of a heat-collecting forage drying system with wind-solar complementary energy supply provided for the present application embodiment, and the following embodiment 2 of a heat-collecting forage drying system with wind-solar complementary energy supply provided for the present application embodiment, refer to FIG. 1 and FIG. 2.

The scheme based on the above embodiment 1:

further, also including a tracking bracket 6 that can track sunlight, the tracking bracket 6 can be designed or used with reference to the existing tracking bracket device without further elaboration. The use of tracking bracket 6 can ensure the maximum use of sunlight, thereby improving photovoltaic power generation and heat collection efficiency.

The solar photovoltaic power generation plate 1, the first solar collector 2a and the second solar collector 2b are all mounted on the tracking bracket together, so as to realize the integrated mounting, the overall structure is more compact, save space and additional tracking brackets 6, and reduce the cost.

Further, the hydrothermal drying device 202 also includes a first condenser 23, the other end of the heat exchanger 22 is in communication with the other end of the water flow collector tube 5 via the first condenser 23, the first condenser 23 is used for cooling water flowing back to the water flow collector tube 5. It is possible to make the water returned to the water flow collector tube 5 as liquid as possible by providing the first condenser 23, which is more effective in heating than in the case of steam-liquid mixing, and has a better drying effect on the forage.

Further, the forage placing stations are multiple, and are divided into two sets in a direction close to or away from the flow equalizing plate 19; a transport aisle 26 is formed between one set of the forage placing stations close to the flow equalizing plate 19 and another set of the forage placing stations away from the flow equalizing plate 19;

the providing of transport aisle 26 is convenient for the transportation of forage. When the forage placing station is designed to be multiple, the number of heat exchangers 22 is multiple and corresponds to the forage placing station on a one-to-one basis, the input ends of multiple heat exchangers 22 can be connected to the output end of the circulating water pump 15 through a branch pipe respectively, and the output ends of multiple heat exchangers 22 can be connected to the water flow collector tube 5 through the branch pipe respectively; certainly, it can also be that multiple heat exchangers 22 are connected head to tail, and then the input end of the first heat exchanger 22 is connected to the output end of the circulating water pump 15, while the output end of the last heat exchanger 22 is connected to the water flow collector tube 5, without restriction.

Further, a first grass placing frame 24 is mounted on the set of forage placing stations close to the flow equalizing plate 19 on a one-to-one correspondence, a second grass placing frame 25 is mounted on another set of forage placing stations away from the flow equalizing plate 19 on the one-to-one correspondence. The number of the first grass placing frame 24 and the second grass placing frame 25 is multiple, for example both are three, without restriction. The first grass placing frame 24 and the second grass placing frame 25 can be integrated with the flow equalizing plate 19 into a certain angle, the angle can be less than 90 degrees, or 90 degrees, or greater than 90 degrees, without restrictions.

The first grass placing frame 24 and the second grass placing frame 25 are both provided with at least one layer of an object placing plate for placing forage and arranged with vent holes; the object placing plate with vent hole for hot air to pass through for better drying of the forage, under the above design, the heat exchanger 22 can be mounted at the bottom of the object placing plate to achieve hot water drying in the lower layer of the forage and hot air drying in the upper layer. The object placing plate can be mounted at a certain downward angle to increase the wind area of the forage.

Further, the air-heat drying device 201 also includes a filter 3, the filter 3 is mounted at the other end of the air collector tube 4. The filter 3 is a conventional air filter module, which can filter the air entering the air collector tube 4 to avoid pollution to forage and improve the quality of dry forage.

Further, also including a turbulent fan 27, the turbulent fan 27 is an existing wind-driven turbulent fan device, without further elaboration, its number can be multiple; the turbulent fan 27 is mounted on the top of the drying storehouse 17, and the fan is driven to rotate under the action of external airflow, thereby forming a turbulent flow in the storage chamber, enhancing the heat transfer performance of hot air drying forage and improving the drying efficiency.

Further, also including a post-processing device 300.

The post-processing device 300 includes an exhaust fan 32, a second condenser 29, a dust collector 30 and a dust collecting bag 31.

Through the dust collector, an air inlet end of the exhaust fan 32 is in communication with an air outlet 28 of the storage chamber which is in communication with the drying storehouse 17; the dust collecting bag 31 is mounted on the dust collector 30; the second condenser 29 is used for cooling air during delivery to the dust collector 30 through the air outlet 28. The warm and humid air after heat exchange is discharged from the drying storehouse 17 via the air outlet 28, and then condensed by the second condenser 29 to remove water vapor, and then treated by the dust collector 30, and discharged by an outlet of cold air 33 connected with the output end of the exhaust fan 32, the impurities such as grass crushing and dust are collected by the dust collecting bag 31. Dust collector 30 can be a cyclone dust removal device, without restrictions.

The design of the post-processing device can reduce the environmental impact and production cost of the drying forage process.

Further, the first condenser 23 and the second condenser 29 are both air-cooled condensers, so the air output through the dust collecting bag 31 is returned to a cooling medium inlet of the first condenser 23 and the second condenser 29 via a circulating pipe; the dry cold airflow discharged from the outlet of cold air 33 is also recycled and used in the airflow purge of the first condenser 23 and the second condenser 29 for energy recovery for circulating cooling, further reducing energy consumption and saving costs.

Further, in order to achieve automatic control, also including a controller 16, a temperature sensor 20 and a humidity sensor 21.

A water flow valve 14 is mounted on the hot water pipe 13, a wind control valve 11 is mounted on the hot air pipe 10, the temperature sensor 20 and the humidity sensor 21 are mounted in the storage chamber. One end of the hot air pipe 10 is connected to one end of the wind control valve 11, and the other end of the wind control valve 11 is connected to the air blower 12; one end of the hot water pipe 13 is connected to the water flow valve 14, and the other end of the water flow valve 14 is connected to the circulating water pump 15.

The controller 16 is electrically connected to the storage battery 9, the water flow valve 14, the wind control valve 11, the temperature sensor 20, and the humidity sensor 21. The controller 16 is also electrically connected to the exhaust fan 32.

The temperature sensor 20 and the humidity sensor 21 can be arranged in multiple sets, uniformly arranged in the storage chamber, which is used to detect the temperature and humidity in the storage chamber in real-time, so as to feed back to the controller 16, the controller 16 controls the opening of the wind control valve 11 according to the feedback data to control the hot air speed, and controls the opening of the water flow valve 14 to control the hot water flow, so as to ensure the drying efficiency and quality of the forage. When the solar thermal energy supply is insufficient, the hydrothermal drying device 202 stops working to save the energy of electric heating water, and the air-heat drying device 201 mainly supplies heat. The controller 16 performs integrated regulation and control according to the requirements of drying temperature and so on, which makes the energy conversion and utilization in the drying system more sufficient, and improves the drying efficiency and dry forage quality.

The above provides a heat-collecting forage drying system with wind-solar complementary energy supply for the present application. For the ordinary skill in the art, according to the idea of the present application embodiment, there will be changes in the detailed description of the embodiments and application scope. In summary, the content of this specification should not be understood as a restriction on the present application.

What is claimed is:

1. A heat-collecting forage drying system with wind-solar complementary energy supply, comprising a drying storehouse, an energy supply device and a drying device; wherein
the energy supply device comprises a solar photovoltaic power generation plate, a wind turbine and a storage battery;
the solar photovoltaic power generation plate and the wind turbine are both electrically connected to the storage battery;
the drying device comprises an air-heat drying device and a hydrothermal drying device;
the air-heat drying device comprises a first solar collector, an air collector tube, an air blower and a standby electric auxiliary heater;
the drying storehouse is provided with a flow equalizing plate;
the flow equalizing plate separates the drying storehouse into an air inlet chamber and a storage chamber;
the storage chamber is provided with a forage placing station;
the standby electric auxiliary heater is mounted in the air inlet chamber for heating air passing through the air inlet chamber;
the air collector tube is mounted on the first solar collector, and a first end of the air collector is in communication with an air inlet end of the air blower via a hot air pipe;
an air outlet end of the air blower is in communication with the air inlet chamber;
the hydrothermal drying device comprises a second solar collector, a water flow collector tube, a circulating water pump and a heat exchanger;
the water flow collector tube is mounted on the second solar collector, and a first end of the water flow collector tube is in communication with a water inlet end of the circulating water pump via a hot water pipe;
the heat exchanger is mounted on the forage placing station, wherein a first end of the heat exchanger is in communication with a water outlet end of the circulating water pump, and a second end of the heat exchanger is in communication with a second end of the water flow collector tube;
the hydrothermal drying device further comprises a first condenser;
the second end of the heat exchanger is in communication with the second end of the water flow collector tube via the first condenser;
the first condenser is used for cooling water flowing back to the water flow collector tube;
further comprising a post-processing device; wherein
the post-processing device comprises an exhaust fan, a second condenser, a dust collector and a dust collecting bag;
through the dust collector (30), an air inlet end of the exhaust fan is in communication with an air outlet of the storage chamber, wherein the storage chamber is in communication with the drying storehouse;
the dust collecting bag is mounted on the dust collector;
the second condenser is used for cooling air during delivery to the dust collector through the air outlet;
the first condenser and the second condenser are both air-cooled condensers; and
the air output through the dust collecting bag is returned to a cooling medium inlet of the first condenser and the second condenser via a circulating pipe;
further comprising a controller, a temperature sensor and a humidity sensor; wherein
a water flow valve is mounted on the hot water pipe;
a wind control valve is mounted on the hot air pipe;
the temperature sensor and the humidity sensor are mounted in the storage chamber; and
the controller is electrically connected to the storage battery, the water flow valve, the wind control valve, the temperature sensor, and the humidity sensor.

2. The heat-collecting forage drying system with wind-solar complementary energy supply according to claim 1, further comprising a tracking bracket configured to track sunlight; wherein
the solar photovoltaic power generation plate, the first solar collector and the second solar collector are mounted on the tracking bracket.

3. The heat-collecting forage drying system with wind-solar complementary energy supply according to claim 1, wherein a plurality of forage placing stations are arranged and divided into a first set and a second set in a direction close to or away from the flow equalizing plate;
a transport aisle is formed between the first set of the forage placing stations close to the flow equalizing plate and the second set of the forage placing stations away from the flow equalizing plate; and
a plurality of heat exchangers are arranged and correspond to the plurality of forage placing stations on a one-to-one basis.

4. The heat-collecting forage drying system with wind-solar complementary energy supply according to claim 3, wherein a first grass placing frame is mounted on the first set of forage placing stations close to the flow equalizing plate on a one-to-one correspondence;
a second grass placing frame is mounted on the second set of forage placing stations away from the flow equalizing plate on the one-to-one correspondence;
the first grass placing frame and the second grass placing frame are both provided with at least one layer of an object placing plate, wherein the object placing plate is configured for placing forage and arranged with vent holes; and
the heat exchanger is mounted at a bottom of the object placing plate.

5. The heat-collecting forage drying system with wind-solar complementary energy supply according to claim 1, wherein the air-heat drying device further comprises a filter; and
the filter is mounted at a second end of the air collector tube.

6. The heat-collecting forage drying system with wind-solar complementary energy supply according to claim 1, further comprising a turbulent fan; wherein
the turbulent fan is mounted on a top of the drying storehouse to form a turbulent flow in the storage chamber.

* * * * *

UNITED STATES PATENT AND TRADEMARK OFFICE
CERTIFICATE OF CORRECTION

| | | |
|---|---|---|
| PATENT NO. | : 12,235,044 B1 | Page 1 of 1 |
| APPLICATION NO. | : 18/824892 | |
| DATED | : February 25, 2025 | |
| INVENTOR(S) | : Qing Xu et al. | |

It is certified that error appears in the above-identified patent and that said Letters Patent is hereby corrected as shown below:

On the Title Page

Insert:
--(30) Foreign Application Priority Data
Dec. 26, 2023 (CN) .....................202311807156--

Signed and Sealed this
Twenty-second Day of April, 2025

Coke Morgan Stewart
*Acting Director of the United States Patent and Trademark Office*